S. J. DUNKLEY.
MACHINE FOR HALVING OR SPLITTING PEACHES.
APPLICATION FILED JAN. 11, 1917. RENEWED MAY 31, 1919.
1,329,755.
Patented Feb. 3, 1920.
2 SHEETS—SHEET 1.
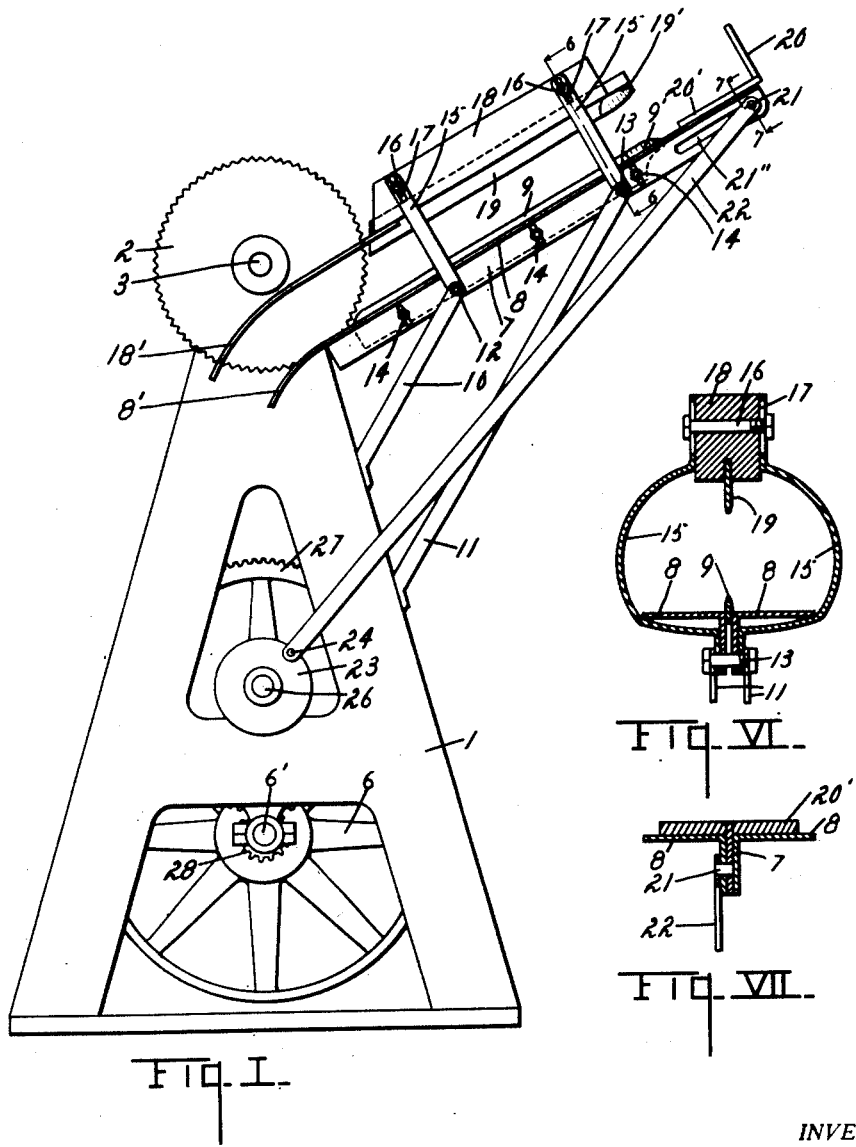
WITNESSES:
Luther Blake
Lenn Gilman
INVENTOR.
SAMUEL J. DUNKLEY
BY Chappell Earl
ATTORNEYS.

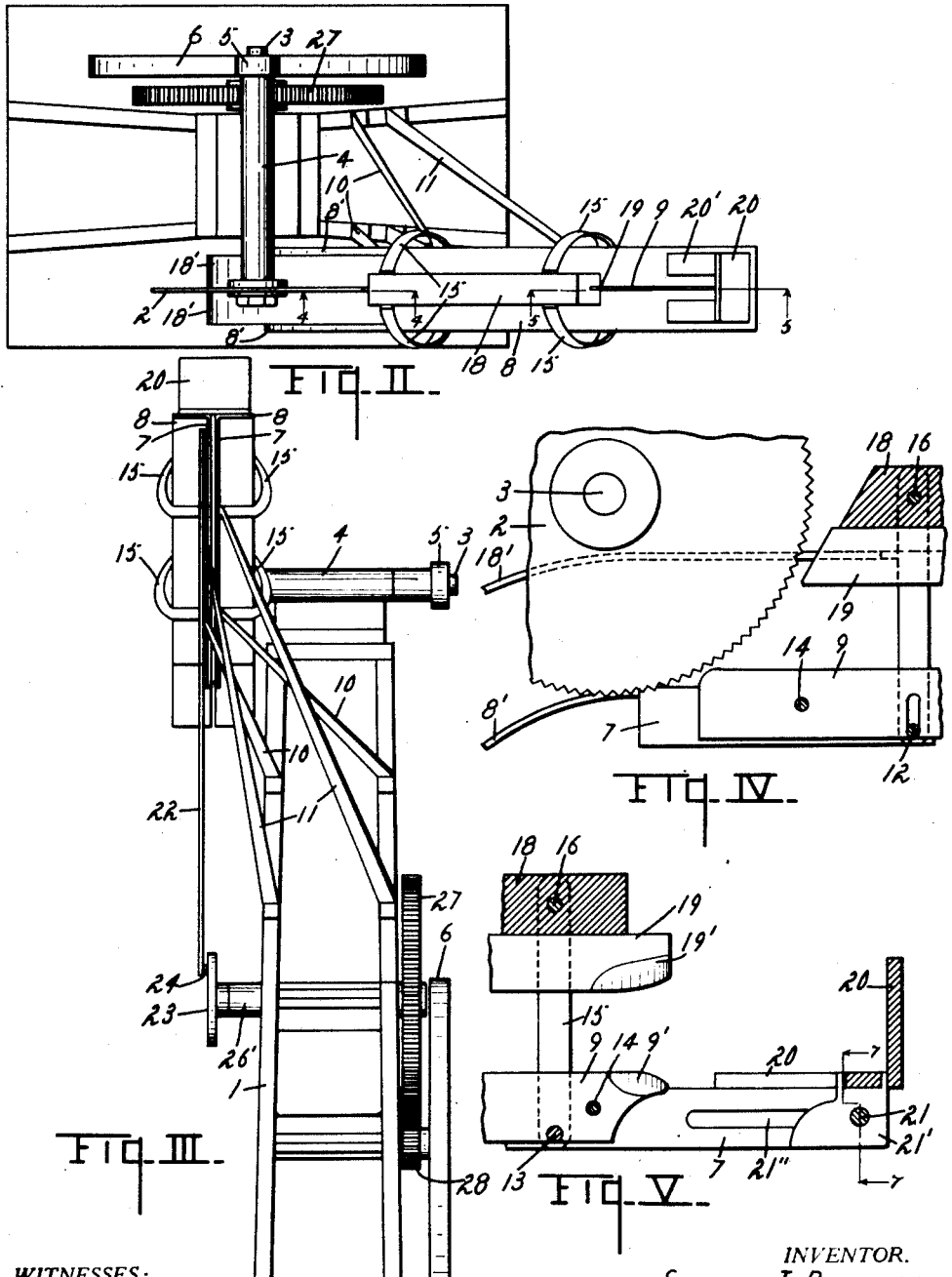

UNITED STATES PATENT OFFICE.

SAMUEL J. DUNKLEY, OF KALAMAZOO, MICHIGAN, ASSIGNOR TO DUNKLEY COMPANY, OF KALAMAZOO, MICHIGAN, A CORPORATION OF MICHIGAN.

MACHINE FOR HALVING OR SPLITTING PEACHES.

1,329,755.  Specification of Letters Patent.  Patented Feb. 3, 1920.

Application filed January 11, 1917, Serial No. 141,887. Renewed May 31, 1919. Serial No. 301,117.

*To all whom it may concern:*

Be it known that I, SAMUEL J. DUNKLEY, a citizen of the United States, residing at Kalamazoo, Michigan, have invented certain new and useful Improvements in Machines for Halving or Splitting Peaches, of which the following is a specification.

This invention relates to an improved machine for halving or splitting peaches and for similar purposes.

The objects of the invention are:

First, to provide an improved general arrangement of saw and rotary cutter means.

Second, to provide an improved guide means for the fruit to deliver the same properly and effectively to the saw or cutter.

Third, to provide an improved feeding means.

Further objects and objects relating to details and economies of construction and operation will definitely appear from the detailed description to follow.

I accomplish the objects of my invention by the devices and means described in the following specification. The invention is clearly defined and pointed out in the claims. A structure which is a preferred embodiment of my invention is fully illustrated in the accompanying drawing forming a part of this specification, in which:

Figure I is a side elevation view of a machine embodying the features of my invention.

Fig. II is a plan view of the machine.

Fig. III is a rear elevation of the same.

Fig. IV is an enlarged detail sectional view showing the relation of the feeding guide to the saw, taken on a line corresponding to line 4—4 of Fig. II.

Fig. V is an enlarged detail sectional view of the fruit feeding device taken on a line corresponding to line 5—5 of Fig. II.

Fig. VI is an enlarged detail sectional view taken on a line corresponding to line 6—6 of Fig. I showing the adjusting and supporting means for the guide blade of the seeding device.

Fig. VII is an enlarged detail transverse sectional view on irregular line 7—7 of Figs. I and V, showing the details of construction of the auxiliary table or slide and the connection for actuating the same.

In the drawing all of the sectional views are taken looking in the direction of the little arrows at the ends of the section lines and similar numerals of reference refer to similar parts throughout the several views.

Considering the numbered parts of the drawing, 1 is the framework carrying the circular saw or rotary cutter 2 supported on a saw mandrel 3, in a suitable bearing 4 at the top of the frame. The saw is driven by pulley 5 which is belted to pulley 6 carried on a suitable shaft below.

The guide table is inclined and made up of a pair of angle irons 7, the vertical portions of which form the supporting midrib and the horizontal portions 8, 8 forming the platform of the guide table.

A guide blade 9 having thickened upper end 9' is clamped between these vertical parts adjustably by bolts 14, and the table is braced by braces 10 and 11 (see Figs. I, II and III). Bolts 12 and 13 extend through the upper ends of the braces and through the vertical limbs of the angle bars forming the table and through the adjusting supports 15, 15 which are bowed outwardly. The upper ends of the supports 15, 15 are brought together, clamping the top bar 18 of the guide which carries the top guide blade 19 having thickened upper end 19'. Bolts 16 extend through slots 17 in the upper ends of these side arms 15, as clearly appears in the cross sectional view of Fig. VI. The guide blades 9 and 19 are exactly parallel to each other, one disposed above the other, with the inwardly projecting edges. That is, the blade 19 has a downwardly projecting edge and the blade 9 has an upwardly projecting edge exactly opposite each other and in the same vertical plane. These blades are disposed in the plane of the saw or rotary cutter 2.

The peach to be split is delivered to the saw by locating it properly in relation thereto and delivering it onto the guide blades 9 and 19, by crowding the same by hand or by the special means past the thickened parts 9' and 19' onto said blades, which will be here described.

Because the upper ends of the blades are thickened at 9' and 19' a groove is formed through the flesh of the peach so that the same slides down the thinner parts of the blade and is guided accurately into position to be cut by the saw or rotary cutter 2.

Guides 8' and 18' are disposed to retain the peach as it is delivered past the saw to permit the same to drop into a suitable receptacle or conveyers beyond.

To facilitate the feeding, the angle bars 7 are extended above the upper ends of the guide blades 9 and 19, and a reciprocating auxiliary feed table 20 is provided, having projecting portions or feet 20' which play upon the top of the table 8. The feet 20' are spaced from each other to pass down each side of the guide blade. A guiding fin 21' with a cross pin 21 therethrough is disposed between the angle bars constituting the table, which bars are slotted at 21'' to permit the reciprocation of this auxiliary table. This reciprocation is effected by the pitman 22 which is connected to the pin 21 at its upper end and is extended down to a wrist pin 24 on disk 23 on shaft 26 in box 26', which is driven by gear 27, which is in mesh with gear 28 on shaft 6'.

In operation with this auxiliary feed table present, the peach is dropped in front of the engaging part of the same or placed in front of same by the operator, the reciprocation of the parts being slowed down by the gear as indicated. The peach will then be forced upon the guides 9, 19, and crowd against the peaches that have passed before the same so that when the machine is being worked very rapidly several peaches will be in line on the guides and will be carried forward to be split open in precisely the right spot by the saw below. When the machine is being worked slowly there will be no peaches in the guide except the one being operated upon the saw. However, if one should be retarded it will be carried forward by the weight of the next one of the peaches that are fed into the machine.

I desire to state that my machine can be driven by direct electric motor or by any suitable connection or by hand power. I have not shown any connection, because this is a detail with which my invention is not concerned.

I have described the machine in a preferred form. I am aware however, that it can be greatly varied in details without departing from my invention.

The reciprocating auxiliary table could be dispensed with and the machine would still operate to feed the peaches very rapidly by starting them with the hands onto the guide blades and while I have shown the machine adjustable, which is highly desirable, I desire to say that there is so very little variation in the size of the pits of peaches that by setting the blades comparatively close together they will take care of a great variety of peaches and consequently the adjustment is not really necessary.

I have shown a simple and effective way of making the platform, but such details can be of course very greatly varied. While I prefer to use a saw, any rotary cutter and likely a simple plane disk will be entirely sufficient for the purpose, as the pits of peaches or similar fruit are quite brittle and will very readily split if brought in proper contact with such rotary cutter. The feed mechanism can be organized with any peach splitting machine. A single guide blade will be of advantage.

Having thus described my invention, what I claim as new and desire to secure by Letters Patent is:

1. The combination of a circular saw on an inclined guide table delivering to the lower part of said saw, a thin blade with thickened upper end in a vertical plane centrally disposed in said guide table and in line with the saw, an upper guide member with a thin blade having thickened upper end in the same plane as the first in line with said saw and in parallel spaced relation to said first blade for engagement and guiding of a peach or similar fruit, a reciprocating auxiliary table with engaging part in line with the feed end of the said guide, with pitman connection to a rotary part of the machine timed for reciprocation thereof whereby the fruit can be placed on said circular table and forced upon the slides by mechanical means as specified.

2. The combination of a circular saw on an inclined guide table delivering to the lower part of said saw, a thin blade with thickened upper end in a vertical plane centrally disposed in said guide table and in line with the saw, an upper guide member with a thin blade having thickened upper end in the same plane as the first in line with said saw, and in parallel spaced relation to said first blade for engagement and guiding of a peach or similar fruit, as specified.

3. In a peach splitting machine, the combination of a circular saw or cutter, guides for delivering peaches thereto comprising oppositely disposed blades having thickened upper ends in the plane of said saw or cutter, the said blades being spaced to engage the pulp of a peach or fruit at each side of the pit, coacting for the purpose specified.

4. In a peach splitting machine, the combination of peach splitting means, guides for delivering peaches thereto comprising oppositely disposed blades, the said blades being spaced to engage the pulp of a peach or fruit at each side, coacting for the purpose specified.

5. In a peach splitting machine, the combination of peach splitting means, guides for delivering peaches thereto comprising oppositely disposed blades in the plane of said saw or cutter, the said blades being spaced to engage the pulp of a peach or fruit at each side, coacting for the purpose specified.

6. In a peach splitting machine, a guide comprising a blade with thickened upper end, disposed to engage the pulp of the fruit.

7. In a peach splitting machine, the combination of peach splitting means and a guide for the peaches comprising a blade disposed to engage the pulp of the fruit.

In witness whereof, I have hereunto set my hand and seal in the presence of two witnesses.

SAMUEL J. DUNKLEY. [L. S.]

Witnesses:
LUELLO G. GREENFIELD,
MARGARET L. GLASGOW.